(12) United States Patent
Xie et al.

(10) Patent No.: US 11,997,004 B2
(45) Date of Patent: May 28, 2024

(54) REVERSE PATH FORWARDING RPF CHECK METHOD AND APPARATUS

(71) Applicant: Huawei Technologies Co., Ltd., Shenzhen (CN)

(72) Inventors: Jingrong Xie, Beijing (CN); Yang Xia, Beijing (CN); Yisong Liu, Shenzhen (CN); Liangge Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 17/701,180

(22) Filed: Mar. 22, 2022

(65) Prior Publication Data

US 2022/0217075 A1 Jul. 7, 2022

Related U.S. Application Data

(63) Continuation of application No. PCT/CN2020/117112, filed on Sep. 23, 2020.

(30) Foreign Application Priority Data

Sep. 23, 2019 (CN) .......................... 201910900954.0

(51) Int. Cl.
*H04L 45/16* (2022.01)
*H04L 12/46* (2006.01)
(Continued)

(52) U.S. Cl.
CPC .......... *H04L 45/16* (2013.01); *H04L 12/4633* (2013.01); *H04L 45/50* (2013.01); *H04L 45/70* (2013.01); *H04L 45/72* (2013.01)

(58) Field of Classification Search
None
See application file for complete search history.

(56) References Cited

U.S. PATENT DOCUMENTS

| 6,917,983 B1 | 7/2005 | Li |
| 7,289,505 B2 | 10/2007 | Sanchez et al. |

(Continued)

FOREIGN PATENT DOCUMENTS

| CN | 1728683 A | 2/2006 |
| CN | 101035009 A | 9/2007 |

(Continued)

OTHER PUBLICATIONS

Bolton, C., et al., "Analyses of the Reverse Path Forwarding Routing Algorithm," International Conference on Dependable Systems and Networks, 2004, 10 pages.

(Continued)

*Primary Examiner* — Christine T Duong
(74) *Attorney, Agent, or Firm* — Conley Rose, P.C.

(57) ABSTRACT

A reverse path forwarding (RPF) check method includes, after receiving a multicast data packet from a head node, a tail node may obtain a multicast source address, a multicast group address and encapsulation information that are carried in the multicast data packet. The tail node obtains, based on the multicast source address, the multicast group address, and a first correspondence, a first identifier identifying an upstream multicast hop (UMH) node corresponding to the multicast data packet. The tail node may further obtain, based on the encapsulation information of the multicast data packet and a second correspondence, a second identifier identifying the head node corresponding to the multicast data packet. After obtaining the first identifier and the second identifier, the tail node may perform an RPF check based on the first identifier and the second identifier.

20 Claims, 7 Drawing Sheets

(51) Int. Cl.
   *H04L 45/00* (2022.01)
   *H04L 45/50* (2022.01)

(56) References Cited

U.S. PATENT DOCUMENTS

| | | | |
|---|---|---|---|
| 7,808,993 | B2 | 10/2010 | Zwiebel et al. |
| 7,953,089 | B1 | 5/2011 | Ramakrishnan et al. |
| 8,605,722 | B1 | 12/2013 | Sindhu et al. |
| 8,625,603 | B1 | 1/2014 | Ramakrishnan et al. |
| 8,830,931 | B2 | 9/2014 | Chung et al. |
| 9,166,903 | B2 | 10/2015 | Kotalwar et al. |
| 9,240,893 | B2 | 1/2016 | Zwiebel et al. |
| 2003/0223402 | A1 | 12/2003 | Sanchez et al. |
| 2007/0091891 | A1 | 4/2007 | Zwiebel et al. |
| 2009/0268607 | A1 | 10/2009 | Wang et al. |
| 2012/0008588 | A1 | 1/2012 | Chung et al. |
| 2012/0163373 | A1* | 6/2012 | Lo ............ H04L 12/18 370/354 |
| 2013/0003732 | A1* | 1/2013 | Dholakia ........ H04L 12/18 370/390 |
| 2013/0034097 | A1 | 2/2013 | Dharmapurikar et al. |
| 2014/0169366 | A1 | 6/2014 | Kotalwar et al. |
| 2015/0195093 | A1 | 7/2015 | Mahadevan et al. |
| 2015/0358226 | A1 | 12/2015 | Liu |
| 2016/0099859 | A1 | 4/2016 | Mohammadi et al. |
| 2020/0267011 | A1 | 8/2020 | Peng et al. |

FOREIGN PATENT DOCUMENTS

| | | |
|---|---|---|
| CN | 101060494 A | 10/2007 |
| CN | 101150423 A | 3/2008 |
| CN | 101232392 A | 7/2008 |
| CN | 101296179 A | 10/2008 |
| CN | 101330448 A | 12/2008 |
| CN | 101447942 A | 6/2009 |
| CN | 101478477 A | 7/2009 |
| CN | 101588296 A | 11/2009 |
| CN | 101599841 A | 12/2009 |
| CN | 101616015 A | 12/2009 |
| CN | 102457386 A | 5/2012 |
| CN | 102946332 A | 2/2013 |
| CN | 103220255 A | 7/2013 |
| CN | 106664244 A | 5/2017 |
| IN | 102891758 A | 1/2013 |
| NO | 2018228490 A1 | 12/2018 |

OTHER PUBLICATIONS

Xie, J., et al., "Use of BIER IPv6 Encapsulation (BIERv6) for Multicast VPN in IPv6 networks," draft-xie-bier-ipv6-mvp-01, Jul. 1, 2019, 14 pages.

"IP Multicast: MVPN Configuration Guide," 2016, Cisco, 160 pages.

Lai, J., et al., Research and Implementation of PIM-SM Multicast Routing Protocol based on IPV6, Communications Technology, vol. 41, No. 08, 2008, No. 200, Totally, with an English Abstract, 3 pages,.

Rosen E, Ed. "Cisco Systems Solution for Multicast in BGP/MPLS IP VPNs," RFC 6037, Oct. 2010, 25 pages.

IJ. Wijnands, Ed., et al., "Label Distribution Protocol Extensions for Point-to-Multipoint and Multipoint-to-Multipoint Label Switched Paths," RFC 6388, Nov. 2011, 39 pages.

E. Rosen, Ed., et al., "Multicast in MPLS/BGP IP VPNs," RFC 6513, Feb. 2012, 88 pages.

R. Aggarwal, et al., "BGP Encodings and Procedures for Multicast in MPLS/BGP IP VPNs," RFC 6514, Feb. 2012, 59 pages.

R. Aggarwal, et al., "IPv4 and IPV6 Infrastructure Addresses in BGP Updates for Multicast VPN," RFC 6515, Feb. 2012, 8 pages.

W. George, Ed., et al., "Gap Analysis for Operating IPv6-Only MPLS Networks," RFC 7439, Jan. 2015, 28 pages.

Z. Zhang, et al., "Global Table Multicast with BGP Multicast VPN (BGP-MVPN) Procedures," RFC 7716, Dec. 2015, 22 pages.

E. Rosen, Ed et al., "Ingress Replication Tunnels in Multicast VPN," RFC 7988, Oct. 2016, 23 pages.

IJ. Wijnands, Ed. et al., "Encapsulation for Bit Index Explicit Replication (BIER) in MPLS and Non-MPLS Networks," RFC 8296, Jan. 2018, 24 pages.

E. Rosen, Ed et al., "Multicast VPN Using Bit Index Explicit Replication (BIER)," RFC 8556, Apr. 2018, 17 pages.

* cited by examiner

REVERSE PATH FORWARDING RPF CHECK METHOD AND APPARATUS

CROSS-REFERENCE TO RELATED APPLICATIONS

This is a continuation of International Patent Application No. PCT/CN2020/117112 filed on Sep. 23, 2020, which claims priority to Chinese Patent Application No. 201910900954.0 filed on Sep. 23, 2019. All of the aforementioned patent applications are hereby incorporated by reference in their entireties.

TECHNICAL FIELD

This application relates to the communication field, and in particular, to a reverse path forwarding (RPF) check method and apparatus.

BACKGROUND

A virtual private network (VPN) may be deployed on a network edge (provider edge (PE)) node that is in a core network and that is provided by a provider. Correspondingly, a VPN instance may be used to process a multicast service. The multicast service can be used to send a multicast data packet from one PE to one or more other PEs in a multicast group.

In an actual application, when a multicast data packet is sent from one PE to a plurality of other PEs, a PE that receives the multicast data packet, for example, a tail node, needs to perform an RPF check on the received multicast data packet. The tail node determines, based on a check result, whether to forward the multicast data packet. The RPF check is to determine whether the multicast data packet comes from a selected upstream multicast hop (UMH) node. If the multicast data packet comes from the selected UMH node, the tail node forwards the multicast data packet, or if the multicast data packet does not come from the selected UMH node, the tail node discards the multicast data packet.

When a provider network in which the VPN is deployed is an Internet Protocol (IP) version 6 (IPv6) network, an RPF check performed by a tail node that implements a multicast service is complex.

SUMMARY

Embodiments of this application provide an RPF method and apparatus, to simplify an RPF check.

According to a first aspect, an embodiment of this application provides an RPF check method. After receiving a multicast data packet from a head node, a tail node may parse the multicast data packet, to obtain a multicast source address, a multicast group address, and encapsulation information that are carried in the multicast data packet. After determining the multicast source address and the multicast group address, the tail node may obtain, based on the multicast source address, the multicast group address, and a first correspondence, a first identifier used to identify an UMH node corresponding to the multicast data packet. The first correspondence includes a mapping relationship among the multicast source address, the multicast group address, and the first identifier. Therefore, after determining the multicast source address and the multicast group address, the tail node may determine the first identifier based on the first correspondence. In addition, the tail node may further obtain, based on the encapsulation information of the multicast data packet and a second correspondence, a second identifier used to identify the head node corresponding to the multicast data packet. After obtaining the first identifier and the second identifier, the tail node may perform an RPF check based on the first identifier and the second identifier. It can be understood that, in an IPv6 network, an address of a node is represented by using 128 bits. Therefore, when performing the RPF check, the tail node needs to compare two pieces of 128-bit data. Consequently, the RPF check is complex. However, in this embodiment of this application, data lengths of the first identifier and the second identifier each are less than 128 bits. Therefore, in this embodiment of this application, the two pieces of data less than 128 bits may be compared, to complete the RPF check. It can be learned that, compared with a conventional technology, the RPF check is simplified in the solution provided in this embodiment of this application.

In an implementation, the first correspondence may be generated by the tail node in advance. Further, the tail node may receive a multicast join message sent by a customer edge node. The multicast join message includes the multicast source address and the multicast group address. After receiving the multicast join message, the tail node may parse the multicast join message to obtain the multicast source address in the multicast join message, and obtain an IPv6 address of the UMH node based on the multicast source address. Then, the tail node obtains, based on the IPv6 address of the UMH node, a first identifier corresponding to the IPv6 address of the UMH node, and establishes a correspondence among the multicast source address, the multicast group address, and the first identifier, in other words, establishes the first correspondence, so that the first identifier is determined based on the first correspondence during a subsequent RPF check.

In an implementation, in addition to the multicast source address, the multicast group address, and the first identifier, the first correspondence may further include an identifier of a multicast instance. The multicast instance corresponds to the tail node. In other words, the multicast instance is a multicast instance of the tail node. In this case, in a specific implementation of obtaining the IPv6 address of the UMH node based on the multicast source address, the tail node may further determine the identifier of the multicast instance, and then the tail node searches for the IPv6 address of the UMH node with reference to the identifier of the multicast instance and the multicast source address. Further, the tail node may determine the IPv6 address of the UMH node based on a predetermined third correspondence that includes the multicast source address, the identifier of the multicast instance, and the IPv6 address of the UMH node. Correspondingly, when establishing the first correspondence, the tail node may further establish a first correspondence among the multicast source address, the multicast group address, the first identifier, and the identifier of the multicast instance.

In an implementation, for a multicast VPN (MVPN), the identifier of the multicast instance may be an identifier of an MVPN instance, and for an Ethernet VPN (EVPN), the identifier of the multicast instance may be an identifier of an EVPN instance. In addition, in an actual application, for the MVPN, an identifier of virtual routing and forwarding (VRF) to which an interface that receives the multicast join message belongs may be used to identify a multicast instance. Therefore, for the MVPN, the identifier of the multicast instance may be, for example, the identifier of the VRF to which the interface that receives the multicast join message belongs.

In an implementation, the second correspondence may be generated by the tail node in advance. Further, when a tunnel that carries a multicast service is a Multiprotocol Label Switching (MPLS) point-to-multipoint (P2MP) tunnel, the tail node may establish the second correspondence in the following manner. The tail node receives a multicast routing message sent by the head node. The multicast routing message includes an IPv6 address of the head node and an identifier of an MPLS P2MP tunnel between the head node and the tail node. The tail node obtains the encapsulation information based on the identifier of the MPLS P2MP tunnel and a fourth correspondence. The tail node obtains the second identifier based on the IPv6 address of the head node, and the second identifier corresponds to the IPv6 address of the head node. The tail node obtains the second correspondence based on the encapsulation information and the second identifier.

In an implementation, the second correspondence may be generated by the tail node in advance. Further, when a tunnel that carries a multicast service is a Bit Index Explicit Replication (BIER) tunnel, the tail node may establish the second correspondence in the following manner. The tail node receives multicast routing information sent by the head node. The multicast routing information includes an IPv6 address of the head node and an identifier of the BIER tunnel. The tail node obtains the encapsulation information based on the identifier of the BIER tunnel and a fifth correspondence. The tail node obtains the second identifier based on the IPv6 address of the head node, and the second identifier corresponds to the IPv6 address of the head node. The tail node obtains the second correspondence based on the encapsulation information and the second identifier.

In an implementation, the second correspondence may be generated by the tail node in advance. Further, when a tunnel that carries a multicast service is a BIERv6 tunnel, the tail node may establish the second correspondence in the following manner. The tail node receives multicast routing information sent by the head node. The multicast routing information includes the encapsulation information and an IPv6 address of the head node. The encapsulation information is an IPv6 address allocated by the head node to a multicast instance of the tail node. The tail node obtains the second identifier based on the IPv6 address of the head node, and the second identifier corresponds to the IPv6 address of the head node. The tail node obtains the second correspondence based on the encapsulation information and the second identifier.

In an implementation, for the MVPN, the multicast routing message sent by the head node to the tail node is MVPN routing information, for example, BGP MVPN address family routing information. For the EVPN, the multicast routing information sent by the head node to the tail node is EVPN routing information, for example, BGP EVPN address family routing information.

In an implementation, in an actual application, an address of a node in an IP version 4 (IPv4) network may be represented by using 32 bits, and complexity of comparing two pieces of 32-bit data usually falls within a range that can be tolerated by the tail node. Therefore, in an implementation of this embodiment of this application, the first identifier and the second identifier each may be a value less than or equal to 32 bits.

In an implementation, it is considered that a provider network may alternatively be a v4v6 dual-stack network, and the address of the node in the IPv4 network may be represented by using 32 bits. To distinguish the first identifier from the address of the node in the IPv4 network and distinguish the second identifier from the address of the node in the IPv4 network, a value range of the first identifier cannot overlap an address range of the node in the IPv4 network, and correspondingly, a value range of the second identifier cannot overlap the address range of the node in the IPv4 network. Currently, a value in a range 0x7F000000-0x7FFFFFFF is not used as the address of the node in the IPv4 network, and a value in a range 0xE0000000-0xEFFFFFFF is not used as the address of the node in the IPv4 network. Therefore, the first identifier and the second identifier may fall within the range 0x7F000000-0x7FFFFFFF, or the first identifier and the second identifier may fall within the range 0xE0000000-0xEFFFFFFF.

According to a second aspect, an embodiment of this application provides an RPF check apparatus. The apparatus includes a receiving unit configured to receive a multicast data packet from a head node, where the multicast data packet includes a multicast source address, a multicast group address, and encapsulation information, an obtaining unit configured to obtain a first identifier based on the multicast source address, the multicast group address, and a first correspondence, where the first correspondence includes the multicast source address, the multicast group address, and the first identifier, and the first identifier is used to identify an UMH node corresponding to the multicast data packet, where the obtaining unit is further configured to obtain a second identifier based on the encapsulation information and a second correspondence, where the second correspondence includes the encapsulation information and the second identifier, the second identifier is used to identify the head node, and the first identifier and the second identifier each are less than 128 bits, and an RPF check unit configured to perform an RPF check based on the first identifier and the second identifier.

In an implementation, the receiving unit is further configured to receive a multicast join message sent by a customer edge node, where the multicast join message includes the multicast source address and the multicast group address, and the obtaining unit is further configured to obtain an IPv6 address of the UMH node based on the multicast source address, obtain the first identifier based on the IPv6 address of the UMH node, where the first identifier corresponds to the IPv6 address of the UMH node, and obtain the first correspondence based on the multicast source address, the multicast group address, and the first identifier.

In an implementation, the first correspondence further includes an identifier of a multicast instance, and the obtaining unit is further configured to determine an identifier of a multicast instance to which an interface that receives the multicast join message belongs, obtain the IPv6 address of the UMH node based on the multicast source address, a third correspondence, and the identifier of the multicast instance, where the third correspondence includes the multicast source address, the identifier of the multicast instance, and the IPv6 address of the UMH node, and obtain the first correspondence based on the multicast source address, the multicast group address, the identifier of the multicast instance, and the first identifier.

In an implementation, the identifier of the multicast instance includes an identifier of VRF or an identifier of an EVPN instance.

In an implementation, the receiving unit is further configured to receive multicast routing information sent by the head node, where the multicast routing information includes an IPv6 address of the head node and an identifier of a MPLS P2MP tunnel between the head node and the tail node, and the obtaining unit is further configured to obtain the encapsulation information based on the identifier of the MPLS P2MP tunnel and a fourth correspondence, where the fourth correspondence includes the identifier of the MPLS P2MP tunnel and the encapsulation information, and the encapsulation information includes a label allocated by the tail node to the MPLS P2MP tunnel, obtain the second identifier based on the IPv6 address of the head node, where the second identifier corresponds to the IPv6 address of the head node, and obtain the second correspondence based on the encapsulation information and the second identifier.

In an implementation, the receiving unit is further configured to receive multicast routing information sent by the head node, where the multicast routing information includes an IPv6 address of the head node and an identifier of a BIER tunnel between the head node and the tail node, and the identifier of the BIER tunnel includes a BIER sub-domain identifier sub-domain identifier (ID), and the obtaining unit is further configured to obtain the encapsulation information based on the identifier of the BIER tunnel and a fifth correspondence, where the fifth correspondence includes the identifier of the BIER tunnel and the encapsulation information, and the encapsulation information includes a bit index forwarding table (BIFT) id corresponding to the tail node, obtain the second identifier based on the IPv6 address of the head node, where the second identifier corresponds to the IPv6 address of the head node, and obtain the second correspondence based on the encapsulation information and the second identifier.

In an implementation, the receiving unit is further configured to receive multicast routing information sent by the head node, where the multicast routing information includes the encapsulation information and an IPv6 address of the head node, and the encapsulation information is an IPv6 address allocated by the head node to a multicast instance of the tail node, and the obtaining unit is further configured to obtain the second identifier based on the IPv6 address of the head node, where the second identifier corresponds to the IPv6 address of the head node, and obtain the second correspondence based on the encapsulation information and the second identifier.

In an implementation, the multicast routing information includes MVPN routing information or EVPN routing information.

In an implementation, the first identifier and the second identifier each are a value less than or equal to 32 bits.

In an implementation, the first identifier and the second identifier fall within one of the following address ranges: 0x7F000000-0x7FFFFFFF or 0xE0000000-0xEFFFFFFF.

According to a third aspect, an embodiment of this application provides an RPF check device. The device includes a processor and a memory, the memory is configured to store instructions, and the processor is configured to execute the instructions in the memory, to perform the method according to any one of the first aspect and the implementations of the first aspect.

According to a fourth aspect, an embodiment of this application provides a computer-readable storage medium, including instructions. When the instructions are run on a computer, the computer is enabled to perform the method according to any one of the first aspect and the implementations of the first aspect.

According to a fifth aspect, an embodiment of this application provides a computer program product including instructions. When the computer program product runs on a computer, the computer is enabled to perform the method according to any one of the first aspect and the implementations of the first aspect.

DESCRIPTION OF EMBODIMENTS

Embodiments of this application provide an RPF check method, to resolve a problem that an RPF check performed by a tail node is complex when a provider network in which a VPN is deployed is an IPv6 network in a conventional technology.

For ease of understanding, an application scenario of the embodiments of this application is first described.

Figure 1:
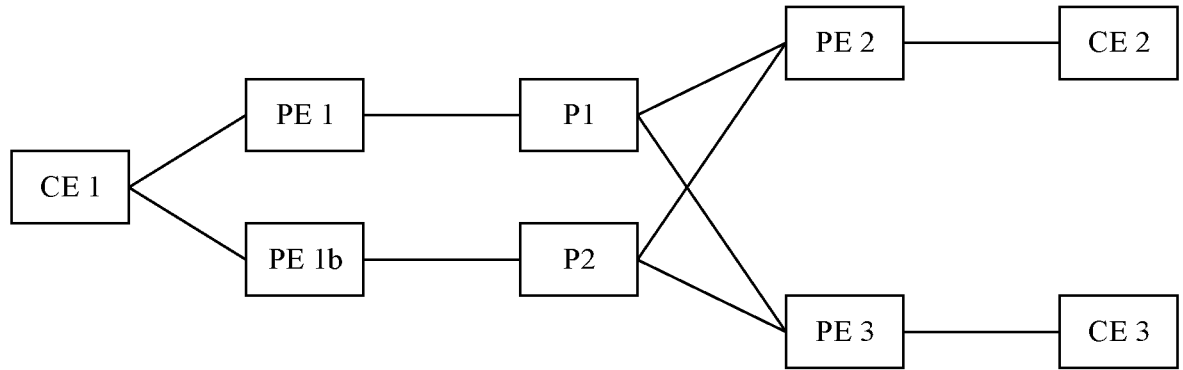
FIG. 1 is a schematic diagram of a structure of a multicast network according to an embodiment of this application.

FIG. 1 is a schematic diagram of a structure of a multicast network according to an embodiment of this application.

As shown in FIG. 1, a customer edge (CE) 1, a CE 2, and a CE 3 may be user equipment. Further, the CE 1, the CE 2, and the CE 3 may be user border routers. A PE 1, a PE 1*b*, P1, P2, a PE 2, and a PE 3 are devices in a provider network. The CE 1 is connected to a multicast source server, to be specific, to a source node that sends a multicast data packet. The PE 1, the PE 1*b*, the PE 2, and the PE 3 are edge nodes in the provider network. The CE 2 and the CE 3 are connected to a multicast receive node. The multicast receive node may be, for example, a personal computer (PC) or a set top box (STB) device. The CE 2 may receive a multicast data packet from the PE 2, and the CE 3 may receive a multicast data packet from the PE 3.

It should be noted that, in an actual application, a VPN may be deployed on an edge node in the provider network. Based on signaling used for a VPN instance and a networking structure in which the VPN instance is deployed, the VPN may be a layer-3 VPN (L3VPN) or an EVPN. In the L3VPN, a unicast service may be established based on Border Gateway Protocol (BGP) VPNv4 signaling or VPNv6 signaling, or a multicast service, namely, an MVPN service, may be established based on BGP MVPN signaling. In the EVPN, a unicast service may be established based on BGP EVPN signaling, or a multicast service, namely, an EVPN multicast service may be established based on BGP EVPN multicast signaling. In addition, a multicast service may also be established based on the BGP MVPN signaling in the EVPN, and such a multicast service is also referred to as an MVPN service. There is a same general procedure of processing the multicast service in the MVPN and the EVPN. In the following description in this embodiment of this application, the MVPN is used as an example for description.

If a multicast service between a PE of a provider and user equipment, namely, a CE is IPv6 multicast, the multicast service is referred to as an IPv6 MVPN. If a multicast service between a PE of a provider and user equipment, namely, a CE is IPv4 multicast, the multicast service is referred to as an IPv4 MVPN. In this embodiment of this application, both the IPv6 MVPN and the IPv4 MVPN are applicable, and are collectively referred to as an MVPN.

A part between PEs of the provider is referred to as a VPN backbone. In this embodiment of this application, the VPN backbone may be a network in which an IPv6 single protocol stack runs or a network in which an IPv4 and IPv6 dual-stack (or a v4v6 dual-stack) runs. It only needs to be ensured that an IPv6 address is used for multicast route selection in the MVPN. Whether the IPv6 single protocol stack or the v4v6 dual-stack is used is not limited in this embodiment of this application.

In addition, MVPN signaling is applicable for both VPN multicast and public network multicast. The VPN multicast may be a VPN established based on the L3 VPN, or may be a VPN established based on the EVPN. The MVPN in this embodiment of this application includes both an MVPN signaling manner used for public network multicast and an MVPN signaling manner used for VPN multicast. This is not limited in this embodiment of this application.

Certainly, a multicast network between the PE of the provider and the user equipment may alternatively be a v4v6 dual-stack network. In other words, both an IPv4 network and an IPv6 network are supported. In this embodiment of this application, a network between the PE of the provider and the user equipment is not limited.

In an actual application, an inclusive provider multicast service interface (IPMSI) tunnel may be used to carry the multicast service in the MVPN. When the IPMSI tunnel is used to carry the multicast service, in a process in which the multicast data packet is transmitted through the tunnel, a layer of encapsulation information matching a used tunnel type may be added to a multicast data packet from a multicast source based on the tunnel type.

The IPMSI tunnel is described with reference to FIG. 1. The IPMSI tunnel may be, for example, a P2MP tunnel established among the PE 1, the PE 1b, the PE 2, and the PE 3, for example, a P2MP tunnel whose root node is the PE 1 and leaf nodes are the PE 1b, the PE 2, and the PE 3. The P2MP tunnel is used to carry the multicast service. For example, all multicast data packets received by the PE 1 may be sent to the PE 2 and the PE 3 through the P2MP tunnel. Certainly, the IPMSI tunnel may alternatively be a P2MP tunnel whose root node is the PE 1b and leaf nodes are the PE 1, the PE 2, and the PE 3. The P2MP tunnel is used to carry the multicast service. For example, all multicast data packets received by the PE 1b may be sent to the PE 2 and the PE 3 through the P2MP tunnel.

It should be noted that FIG. 1 shows the multicast network only for ease of understanding, the multicast network may alternatively be of another structure, and the tunnel type is not limited to the P2MP tunnel. For a multicast network of another structure, a P2MP tunnel or a multipoint-to-multipoint (MP2MP) tunnel may be established between a plurality of PEs based on a specific structure of the multicast network. This is not limited in this embodiment of this application.

As shown in FIG. 1, the CE 1 is connected to the PE 1b in addition to the PE 1. After receiving a multicast join request sent by a user for a multicast group (S1, G1), the PE 2 searches for a next hop of a route of a multicast source address S1. The multicast source address S1 is an IP address or an IPv6 address of a multicast source server connected to the CE 1. For a network in which the MVPN is applied, the route that is of the multicast source address S1 and that is found by the PE 2 may be a VPN private network route, and the next hop of the route is a BGP next hop. A next hop that is of a route of the multicast source and that is found from a tail node of the MVPN is a next hop of "cross the VPN backbone", and is also referred to as a UMH node.

As shown in FIG. 1, two next hops of the CE 1 may exist, and are respectively the PE 1 and the PE 1b. Correspondingly, the PE 2 may also obtain, through query, two next hops of the route to the multicast source address S1. The PE 2 selects, based on a BGP route selection rule, one of the PE 1 and the PE 1b as a UMH node of a multicast source corresponding to S1. This process is referred to as UMH selection. Similarly, the PE 3 makes UMH selection of the PE 3. For example, the PE 2 selects the PE 1 as the UMH of the multicast source corresponding to S1, and the PE 3 selects the PE 1b as the UMH of the multicast source corresponding to S1. If a multicast service is carried in a network shown in FIG. 1, the PE 1 sends the received multicast data packet to the PE 2 and the PE 3. Correspondingly, the PE 1b sends the received multicast data packet to the PE 2 and the PE 3. It can be understood that, for one multicast data packet sent by CE 1, the PE 2 repeatedly receives the multicast data packet. For example, the multicast data packet may reach the PE 2 through a path CE 1→PE 1→P1→PE 2, and the multicast data packet may alternatively reach the PE 2 through a path CE 1→PE 1b→P2→PE 2. Similarly, the PE 3 repeatedly receives the multicast data packet.

In this case, the PE 2 and the PE 3 perform an RPF check, so that the PE 2 and the PE 3 forward only a packet from a selected UMH node. For example, the PE 2 forwards a packet from the PE 1 and discards a packet from the PE 1b, and the PE 3 forwards a packet from the PE 1b and discards a packet from the PE 1.

In a conventional technology, after receiving a multicast data packet, the tail node, for example, the PE 2, may perform an RPF check on the multicast data packet, in other words, determine whether the multicast data packet comes from the selected UMH node. Further, when the provider network is an IPv6 network, an address of each node in the IPv6 network is represented by using 128 bits. Therefore, if an RPF check needs to be performed, the tail node may obtain a first address of the UMH node, obtain a second address of the head node based on encapsulation information of the multicast data packet, and learn, through comparison, whether the first address is the same as the second address, to complete the RPF check. It can be learned that, in the conventional technology, when a provider network in which a VPN is deployed is an IPv6 network, if an RPF check needs to be completed, two 128-bit IPv6 addresses (namely, the first address and the second address) need to be compared. Consequently, the RPF check is complex. In addition, the tail node needs to store a 128-bit IPv6 address of the UMH node and a 128-bit IPv6 address of the head node. Therefore, a corresponding storage amount is large.

In view of this, an embodiment of this application provides an RPF check method, to simplify the RPF check when the provider network in which a VPN is deployed is an IPv6 network. The RPF check method provided in this embodiment of this application is described below with reference to accompanying drawings.

Figure 2:
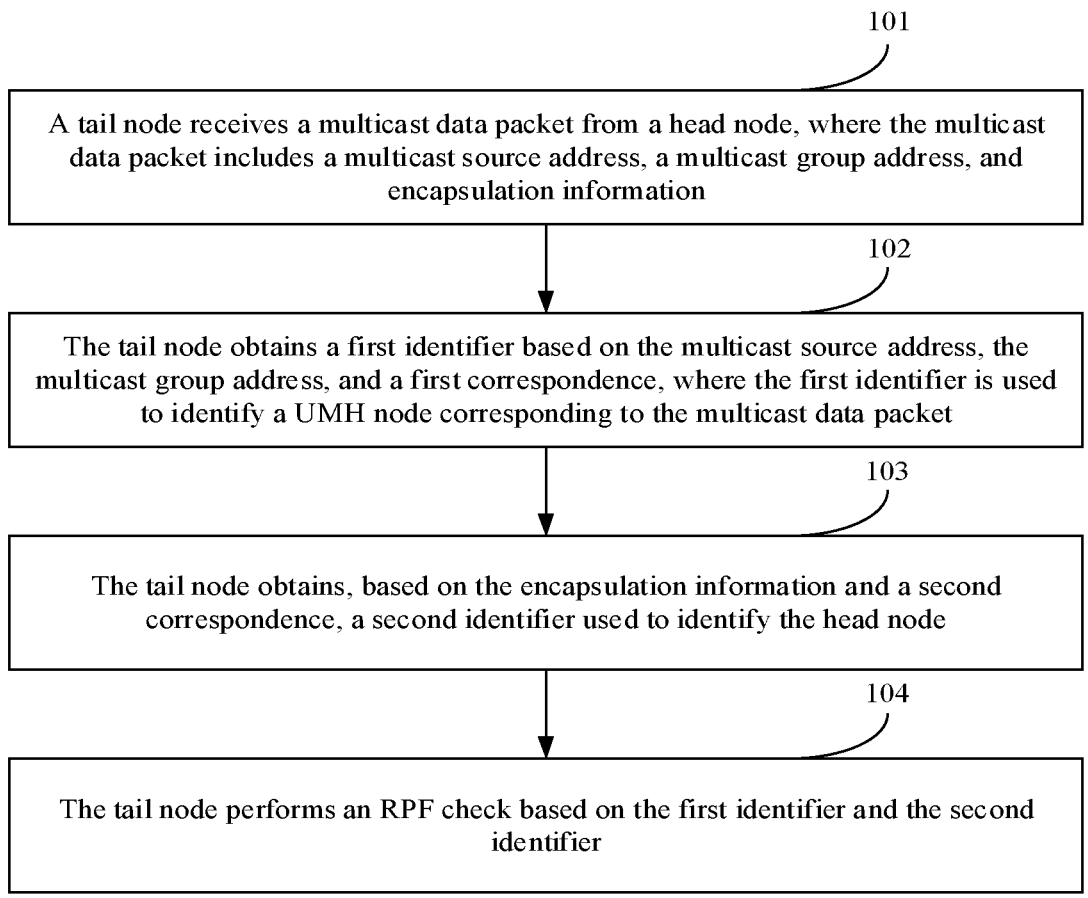
FIG. 2 is a schematic flowchart of an RPF check method according to an embodiment of this application.

FIG. 2 is a schematic flowchart of an RPF check method according to an embodiment of this application.

The RPF check method provided in this embodiment of this application may be applied to an IPv6 network. The IPv6 network includes a head node and a tail node. The head node and the tail node each are an edge node in the IPv6 network. The head node is a node that receives a multicast data packet from a multicast source or user equipment connected to the multicast source. The tail node is a node that receives a multicast data packet from the head node and forwards the multicast data packet to a destination node of the multicast data packet. For example, the PE 1 and the PE 1b in FIG. 1 may be head nodes, and the PE 2 and the PE 3 may be tail nodes.

The RPF check method provided in this embodiment of this application may be implemented, for example, by using the following steps 101 to 104.

Step 101: The tail node receives a multicast data packet from the head node, where the multicast data packet includes a multicast source address, a multicast group address, and encapsulation information.

The multicast data packet in this step is a packet that is sent by the multicast source to the head node, to which the head node adds corresponding encapsulation information, and that is sent to the tail node.

As described above, an IPMSI tunnel may be used to carry a multicast service. When the IPMSI tunnel is used to carry the multicast service, in a process in which the multicast data packet is transmitted through the tunnel, the head node may add, to the multicast data packet from the multicast source based on a used tunnel type, a layer of encapsulation information matching the tunnel type. Further, before forwarding the multicast data packet, the head node may add, to the multicast data packet from the multicast source, an encapsulation that corresponds to the head node and that matches the used tunnel type. For example, after receiving a multicast data packet from a multicast source node, the head node may add the encapsulation information to an outer encapsulation field of the multicast data packet, and send, to the tail node, the multicast data packet to which the encapsulation information is added. In other words, the multicast data packet received by the tail node is a packet that includes the encapsulation information.

After receiving the multicast data packet, the tail node may determine whether to forward the multicast data packet to corresponding user equipment. In this embodiment of this application, the multicast data packet may be an IPv4 packet, or may be an IPv6 packet. This is not limited in this embodiment of this application.

In this embodiment of this application, the multicast data packet carries the multicast source address and the multicast group address. The multicast source address is an address of the multicast source node. The multicast group address is an address of a multicast destination node. After receiving the multicast data packet, the tail node may parse the multicast data packet, to obtain the multicast source address, the multicast group address, and the encapsulation information.

Step 102: The tail node obtains a first identifier based on the multicast source address, the multicast group address, and a first correspondence, where the first identifier is used to identify a UMH node corresponding to the multicast data packet.

In this embodiment of this application, the tail node prestores a correspondence among the multicast source address, the multicast group address, and the first identifier, namely, the first correspondence. The first correspondence may be stored in an entry of a multicast forwarding information based (MFIB) table. Therefore, after determining the multicast source address and the multicast group address, the tail node may determine, based on the first correspondence, the first identifier used to identify the UMH node corresponding to the multicast data packet.

It should be noted that, the first identifier is similar to an address of the UMH node corresponding to the multicast data packet, and the first identifier may also uniquely identify the UMH node corresponding to the multicast data packet. However, in the IPv6 network, the address of the UMH node corresponding to the multicast data packet is 128-bit data. However, in this embodiment of this application, the first identifier is less than 128 bits.

Step 103: The tail node obtains, based on the encapsulation information and a second correspondence, a second identifier used to identify the head node.

In this embodiment of this application, the tail node prestores a correspondence between the encapsulation information and the second identifier, namely, the second correspondence. The second identifier is similar to an address of the head node corresponding to the multicast data packet, and the second identifier may also uniquely identify the head node corresponding to the multicast data packet. However, in the IPv6 network, the address of the head node corresponding to the multicast data packet is 128-bit data. However, in this embodiment of this application, the second identifier is less than 128 bits.

As described in step 101, after receiving the multicast data packet, the tail node may parse the multicast data packet, to obtain the corresponding encapsulation information. After obtaining the encapsulation information through parsing, the tail node may determine, based on the encapsulation information and the second correspondence, the second identifier corresponding to the head node. The second correspondence may be, for example, (MPLS P2MP Label=Lx, RootIP=Rx). After determining that the encapsulation information is Lx, it may be determined that the second identifier is Rx.

It should be noted that the encapsulation information is related to a type of a tunnel that carries the multicast service. In this embodiment of this application, the type of the tunnel that carries the multicast service may be an MPLS P2MP tunnel, may be a BIER-MPLS tunnel, or may be a BIERv6 tunnel. This is not limited in this embodiment of this application.

In this embodiment of this application, when the tunnel that carries the multicast service is an MPLS P2MP tunnel, the corresponding encapsulation information may include an MPLS P2MP tunnel label. When the tunnel that carries the multicast service is a BIER-MPLS tunnel, the corresponding encapsulation information may include a BIFT-ID corresponding to the tail node. When the tunnel that carries the multicast service is a BIERv6 tunnel, the corresponding encapsulation information may include an IPv6 address allocated by the head node to a multicast instance of the tail node.

Step 104: The tail node performs an RPF check based on the first identifier and the second identifier.

It can be understood that after determining the first identifier, the tail node may determine the UMH node. After determining the second identifier, the tail node determines a head node that actually forwards the multicast data packet. Therefore, the tail node may perform the RPF check by comparing the first identifier and the second identifier. When the first identifier is equal to the second identifier, it indicates that the multicast data packet is from a UMH node selected by the tail node, and the RPF check performed on the multicast data packet succeeds. Further, the tail node may forward the multicast data packet. If the first identifier is unequal to the second identifier, it indicates that the multicast data packet is not from a UMH node selected by the tail node, and the RPF check performed on the multicast data packet fails. Further, the tail node may discard the multicast data packet.

It can be learned from the foregoing description that, according to the solution provided in this embodiment of this application, data lengths of the first identifier and the second identifier each are less than 128 bits. Therefore, in this embodiment of this application, the two pieces of data less than 128 bits may be compared, to complete the RPF check. It can be learned that, according to the solution provided in this embodiment of this application, a calculation amount of the RPF check performed by the tail node can be reduced.

As described above, the first identifier and the second identifier each are a value less than or equal to 128 bits. In an actual application, an address of a node in an IPv4 network may be represented by using 32 bits, and complexity of comparing two pieces of 32-bit data usually falls within a range that can be tolerated by the tail node. Therefore, in an implementation of this embodiment of this application, the first identifier and the second identifier each may be a value less than or equal to 32 bits. It can be understood that, if a multicast network is an IPv6 MVPN (or an IPv6 EVPN), because an address of each node is 128 bits, there is no node whose address is described by using 32 bits. Therefore, in this case, the first identifier and the second identifier each may be represented by using any value less than 32 bits.

As described above, a provider network may alternatively be a v4v6 dual-stack network, and the address of the node in the IPv4 network may be represented by using 32 bits. In this case, to distinguish the first identifier from the address of the node in the IPv4 network and distinguish the second identifier from the address of the node in the IPv4 network, a value range of the first identifier cannot overlap an address range of the node in the IPv4 network, and correspondingly, a value range of the second identifier cannot overlap the address range of the node in the IPv4 network. Currently, a value in a range 0x7F000000-0x7FFFFFFF is not used as the address of the node in the IPv4 network, and a value in a range 0xE0000000-0xEFFFFFFF is not used as the address of the node in the IPv4 network. Therefore, in an implementation of this embodiment of this application, the first identifier and the second identifier may fall within the range 0x7F000000-0x7FFFFFFF, or the first identifier and the second identifier may fall within the range 0xE0000000-0xEFFFFFFF.

In this embodiment of this application, the first correspondence may be generated by the tail node in advance. A specific implementation in which the tail node generates the first correspondence is described below with reference to the accompanying drawings.

Figure 3:
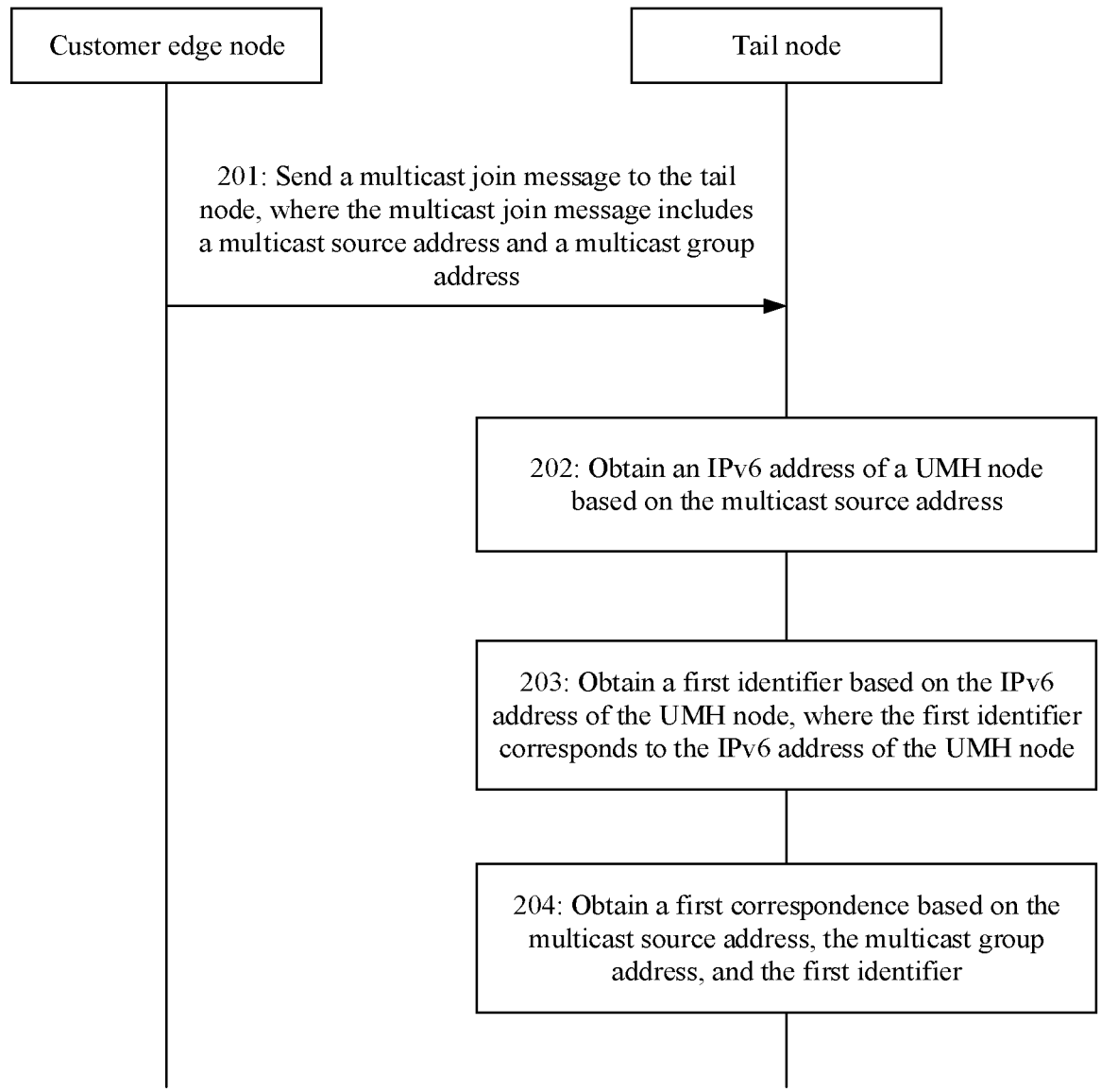
FIG. 3 is a signaling interaction diagram of a method for generating a first correspondence according to an embodiment of this application.

FIG. 3 is a signaling interaction diagram of a method for generating a first correspondence according to an embodiment of this application. The method for generating the first correspondence in FIG. 3 may be implemented, for example, by using the following steps 201 to 204.

Step 201: A customer edge node sends a multicast join message to a tail node, where the multicast join message includes a multicast source address and a multicast group address.

The multicast join message is not limited in this embodiment of this application, and the multicast join message may be, for example, a Protocol-Independent Multicast (PIM) message.

After receiving the multicast join message, the tail node may parse the multicast join message to obtain the multicast source address in the multicast join message, to obtain an IPv6 address of a UMH node subsequently based on the multicast source address.

Step 202: The tail node obtains the IPv6 address of the UMH node based on the multicast source address.

In an actual application, the head node may send a routing message to the tail node. The routing message carries the multicast source address and the IPv6 address of the UMH node. After receiving the routing message, the tail node may store the multicast source address, the IPv6 address of the UMH node, and a correspondence between the multicast source address and the IPv6 address of the UMH node. After receiving the multicast join message sent by the customer edge node, and obtaining, through parsing, the multicast source address carried in the multicast join message, the tail node may obtain the corresponding IPv6 address of the UMH node based on the prestored correspondence between the multicast source address and the IPv6 address of the UMH node.

It should be noted that the routing message sent by the head node to the tail node may be a unicast routing message, or may be a multicast routing message. This is not limited in this embodiment of this application. Further, if the routing message is a unicast routing message, the multicast source address included in the routing message may be an address range or an address prefix that includes the multicast source address. The unicast routing message may be any one of a BGP-VPNv4 routing message, a BGP-VPNv6 routing message, a BGP-EVPN routing message, a BGP-IPv4-unicast routing message, and a BGP-IPv6-unicast routing message. If the routing message is a multicast routing message, the multicast routing message may be a BGP-MVPN IPMSI auto-discovery (IPMSI A-D) routing message, a BGP-MVPN selective provider multicast service interface auto-discovery (SPMSI A-D) routing message, or a BGP-EVPN inclusive multicast ethernet tag (IMET) routing message.

Step 203: The tail node obtains a first identifier based on the IPv6 address of the UMH node, where the first identifier corresponds to the IPv6 address of the UMH node.

In an implementation of this embodiment of this application, after obtaining the IPv6 address of the UMH node, the tail node may map, based on a mapping relationship between the IPv6 address and an identifier, a 128-bit IPv6 address into a first identifier less than 128 bits. In this embodiment of this application, the mapping relationship between the IPv6 address and an identifier may be generated in advance and stored in the tail node or another memory, or may be generated after the tail node determines the IPv6 address of the UMH node. This is not limited in this embodiment of this application.

In still another implementation of this embodiment of this application, after determining the IPv6 address of the UMH node, the tail node may generate the first identifier based on a predetermined identifier generation rule.

Step 204: The tail node obtains the first correspondence based on the multicast source address, the multicast group address, and the first identifier.

After determining the multicast source address, the multicast group address, and the first identifier, the tail node may establish a correspondence among the multicast source address, the multicast group address, and the first identifier, in other words, establish the first correspondence.

In an implementation of this embodiment of this application, in addition to the multicast source address, the multicast group address, and the first identifier, the first correspondence may further include an identifier of a multicast instance. The multicast instance corresponds to the tail node. In other words, the multicast instance is a multicast instance of the tail node. In this case, in a specific implementation of obtaining the IPv6 address of the UMH node based on the multicast source address, the tail node may further determine the identifier of the multicast instance, and then the tail node searches for the IPv6 address of the UMH node with reference to the identifier of the multicast instance and the multicast source address. Further, the tail node may determine the IPv6 address of the UMH node based on a predetermined third correspondence that includes the multicast source address, the identifier of the multicast instance, and the IPv6 address of the UMH node. Correspondingly, when establishing the first correspondence, the tail node may further establish a first correspondence among the multicast source address, the multicast group address, the first identifier, and the identifier of the multicast instance.

The identifier of the multicast instance is not limited in this embodiment of this application. For an MVPN, the identifier of the multicast instance may be an identifier of an MVPN instance, and for an EVPN, the identifier of the multicast instance may be an identifier of an EVPN instance. In addition, in an actual application, for the MVPN, an identifier of VRF to which an interface that receives the multicast join message belongs may be used to identify a multicast instance. Therefore, for the MVPN, the identifier of the multicast instance may be, for example, the identifier of the VRF to which the interface that receives the multicast join message belongs. The tail node may generate a C-multicast route of a BGP MVPN address family, and the C-multicast route carries the first identifier.

In this embodiment of this application, the foregoing second correspondence between encapsulation information and a second identifier may be generated in advance and stored by the tail node. A specific implementation in which the tail node generates the second correspondence is described below with reference to the accompanying drawings.

As described above, when a tunnel that carries a multicast service is an MPLS P2MP tunnel, corresponding encapsulation information may include an MPLS P2MP tunnel label. When a tunnel that carries a multicast service is a BIER-MPLS tunnel, corresponding encapsulation information may include a BIFT-id of the tail node. When a tunnel that carries a multicast service is a BIERv6 tunnel, corresponding encapsulation information may include an IPv6 address allocated by the head node to the multicast instance of the tail node.

Specific implementations of establishing the second correspondence are respectively described below for the three tunnels that carry a multicast service.

Figure 4:
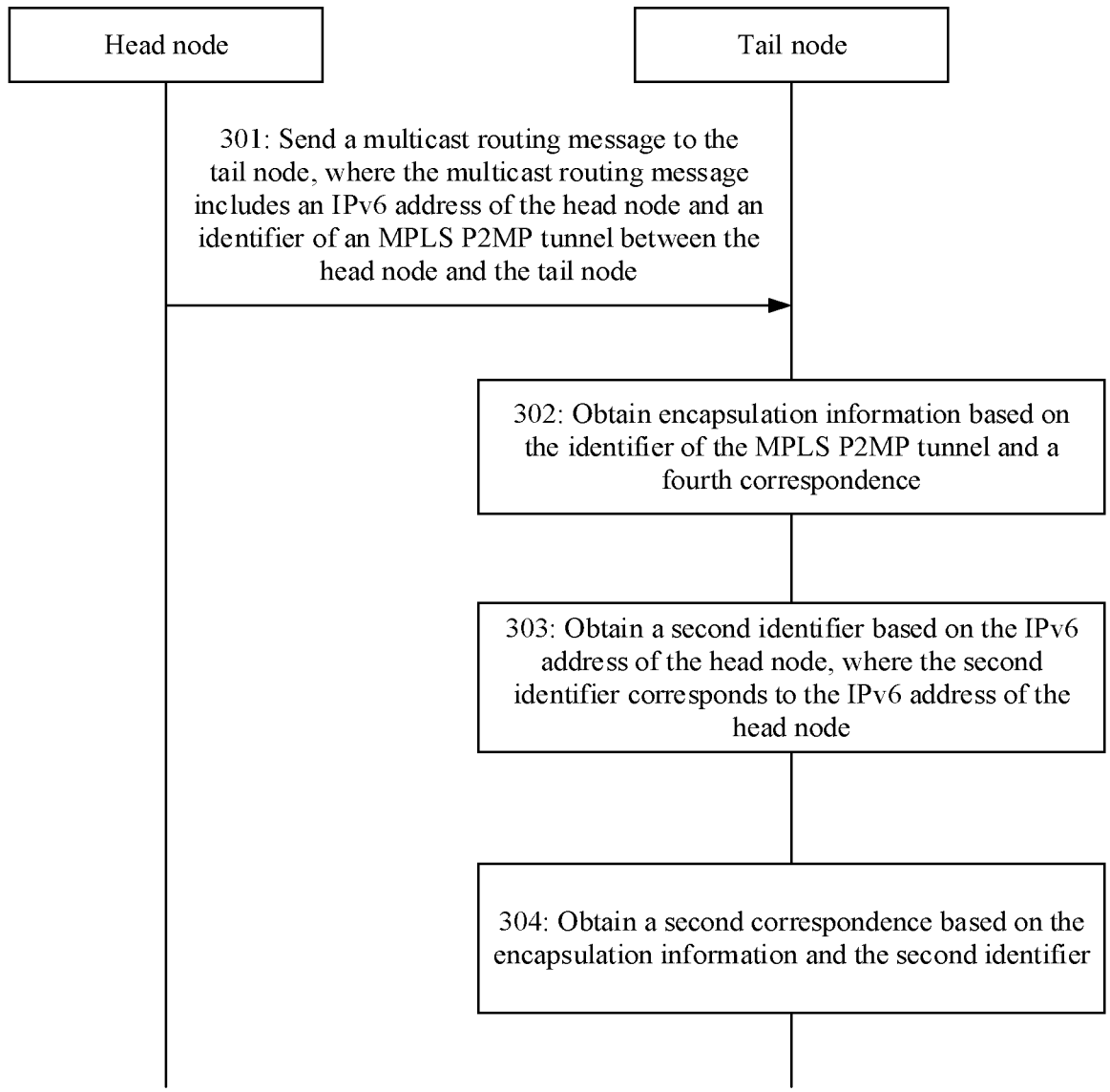
FIG. 4 is a signaling interaction diagram of a method for generating a second correspondence according to an embodiment of this application.

FIG. 4 is a signaling interaction diagram of a method for generating a second correspondence according to an embodiment of this application.

The method shown in FIG. 4 is a signaling interaction diagram in which a tail node generates the second correspondence when a tunnel that carries a multicast service is an MPLS P2MP tunnel. The method shown in FIG. 4 may be implemented, for example, by using the following steps 301 to 304.

Step 301: A head node sends a multicast routing message to the tail node, where the multicast routing message includes an IPv6 address of the head node and an identifier of an MPLS P2MP tunnel between the head node and the tail node.

In this embodiment of this application, when the tunnel that carries the multicast service is an MPLS P2MP tunnel, before transmitting a multicast data packet through a multicast network, the head node may send multicast routing information to the tail node. The multicast routing information carries the IPv6 address of the head node and the identifier of the MPLS P2MP tunnel between the head node and the tail node.

The identifier of the MPLS P2MP tunnel is not limited in this embodiment of this application. The identifier of the MPLS P2MP tunnel includes a Multicast Label Distribution Protocol (mLDP) forwarding equal class (FEC) and a Resource Reservation Protocol-Traffic Engineering (RSVP-TE) session ID.

After receiving the multicast routing message, the tail node may parse the multicast routing message, to obtain the IPv6 address of the head node and the identifier of the MPLS P2MP tunnel between the head node and the tail node.

It can be understood that, for an MVPN, the multicast routing information is MVPN routing information, for example, BGP MVPN address family routing information. For an EVPN, the multicast routing information is EVPN routing information, for example, BGP EVPN address family routing information.

Step 302: The tail node obtains encapsulation information based on the identifier of the MPLS P2MP tunnel and a fourth correspondence.

In this embodiment of this application, after determining the identifier of the MPLS P2MP tunnel, the tail node may determine, with reference to the fourth correspondence, encapsulation information corresponding to the identifier of the MPLS P2MP tunnel. The fourth correspondence includes the identifier of the MPLS P2MP tunnel and the corresponding encapsulation information, and the encapsulation information includes a label allocated by the tail node to the MPLS P2MP tunnel.

Step 303: The tail node obtains a second identifier based on the IPv6 address of the head node, where the second identifier corresponds to the IPv6 address of the head node.

It should be noted that an implementation of step 303 is similar to that of step 203. In an implementation of this embodiment of this application, after obtaining the IPv6 address of the head node, the tail node may map, based on a mapping relationship between the IPv6 address and an identifier, a 128-bit IPv6 address into a second identifier less than 128 bits. In this embodiment of this application, the mapping relationship between the IPv6 address and an identifier may be generated in advance and stored in the tail node or another memory, or may be generated after the tail node determines an IPv6 address of a UMH node. This is not limited in this embodiment of this application.

In still another implementation of this embodiment of this application, after determining the IPv6 address of the head node, the tail node may generate the second identifier based on a predetermined identifier generation rule.

It should be emphasized herein that the mapping relationship between the IPv6 address and an identifier is the same as the mapping relationship between the IPv6 address and an identifier in step 203. The mapping relationship between the IPv6 address and an identifier may be generated in advance and stored in the tail node or another memory. The mapping relationship between the IPv6 address and an identifier may also be generated before or after the tail node receives the multicast routing information sent by the head node. The mapping relationship between the IPv6 address and an identifier may be generated before or after the tail node determines the UMH node. For example, if the tail node first receives a multicast join request from user equipment, and then receives MVPN routing information sent by the head node, the mapping relationship may be generated after the tail node receives the multicast join request from the user equipment. Further, the tail node may determine the UMH node based on the multicast routing information and then generate the mapping relationship, or may generate the mapping relationship and then determine the UMH node. For another example, the tail node receives the multicast routing information sent by the head node and then receives the multicast join request from the user equipment. In this case, the mapping relationship may be established after the tail node receives the multicast routing information. This is not limited in this embodiment of this application. Correspondingly, the identifier generation rule herein and the identifier generation rule in step 203 are a same rule.

Step 304: The tail node obtains the second correspondence based on the encapsulation information and the second identifier.

After determining the second identifier corresponding to the IPv6 address of the head node and the encapsulation information corresponding to the identifier of the MPLS P2MP tunnel, the tail node may establish and store the second correspondence between the encapsulation information and the second identifier, so that when performing an RPF check subsequently, the tail node determines the second identifier based on the second correspondence.

Figure 5:
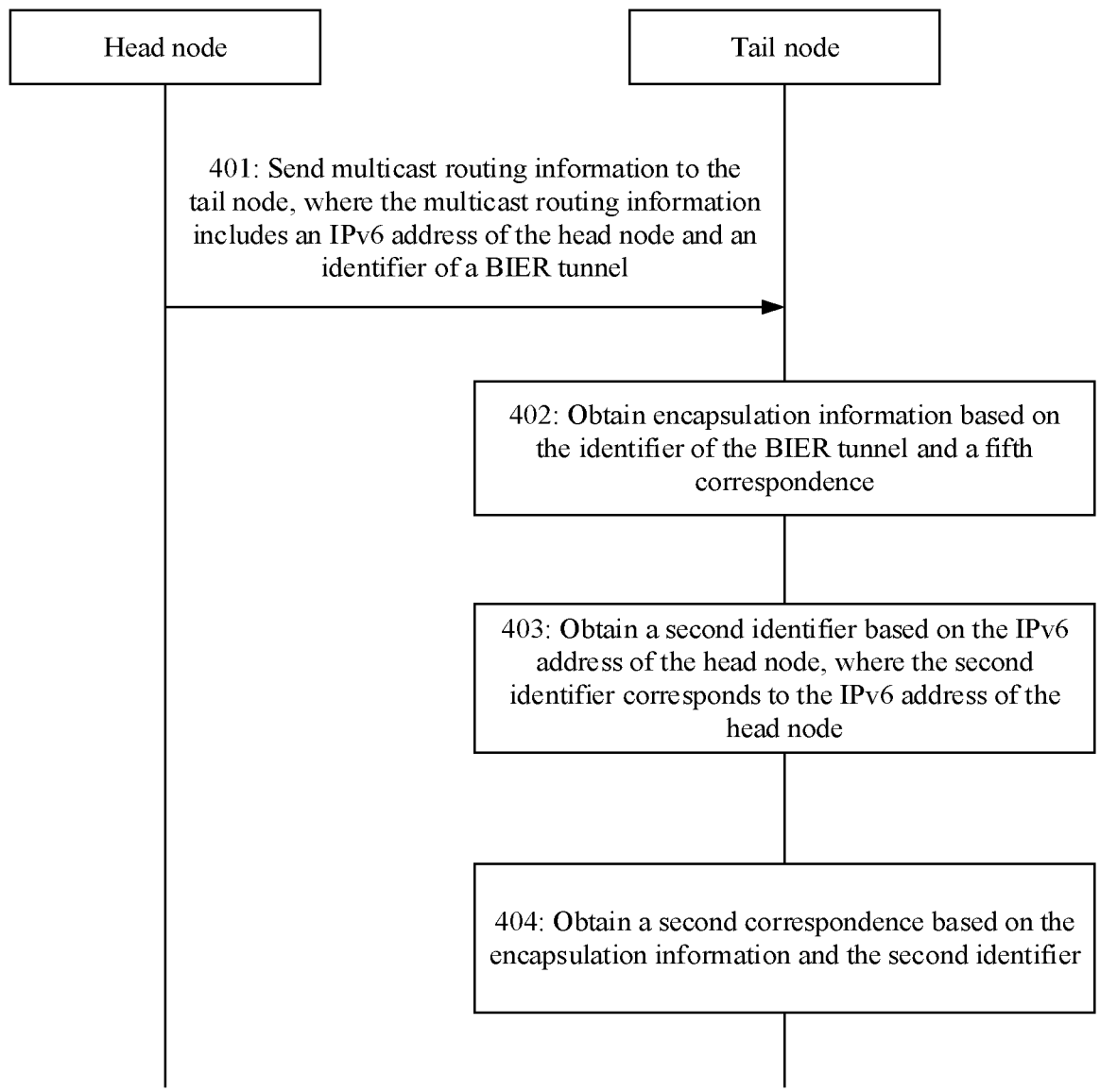
FIG. 5 is a signaling interaction diagram of another method for generating a second correspondence according to an embodiment of this application.

FIG. 5 is a signaling interaction diagram of another method for generating a second correspondence according to an embodiment of this application.

The method shown in FIG. 5 is a signaling interaction diagram in which a tail node generates the second correspondence when a tunnel that carries a multicast service is a BIER-MPLS tunnel. The method shown in FIG. 5 may be implemented, for example, by using the following steps 401 to 404.

Step 401: A head node sends multicast routing information to the tail node, where the multicast routing information includes an IPv6 address of the head node and an identifier of a BIER tunnel.

In this embodiment of this application, when the tunnel that carries the multicast service is a BIER-MPLS tunnel, before transmitting a multicast data packet through a multicast network, the head node may send multicast routing information to the tail node. The multicast routing information carries the IPv6 address of the head node and an identifier of the BIER-MPLS tunnel between the head node and the tail node.

The identifier of the BIER-MPLS tunnel is not limited in this embodiment of this application. The identifier of the BIER-MPLS tunnel includes a BIER sub-domain identifier sub-domain ID.

After receiving the multicast routing message, the tail node may parse the multicast routing message, to obtain the IPv6 address of the head node and the identifier of the BIER tunnel.

It can be understood that, for an MVPN, the multicast routing information is MVPN routing information, for example, BGP MVPN address family routing information. For an EVPN, the multicast routing information is EVPN routing information, for example, BGP EVPN address family routing information.

Step 402: The tail node obtains encapsulation information based on the identifier of the BIER tunnel and a fifth correspondence.

In this embodiment of this application, after determining the identifier of the BIER tunnel, the tail node may determine, with reference to the fifth correspondence, encapsulation information corresponding to the identifier of the BIER tunnel. The fifth correspondence includes the identifier of the BIER tunnel and the corresponding encapsulation information, and the encapsulation information includes a BIFT-id corresponding to the tail node.

Step 403: The tail node obtains a second identifier based on the IPv6 address of the head node, where the second identifier corresponds to the IPv6 address of the head node.

Step 404: The tail node obtains a second correspondence based on the encapsulation information and the second identifier.

Steps 403 and 404 are similar to an implementation of steps 303 and 304. For a specific description, refer to a description part of steps 303 and 304. Details are not described herein again.

Figure 6:
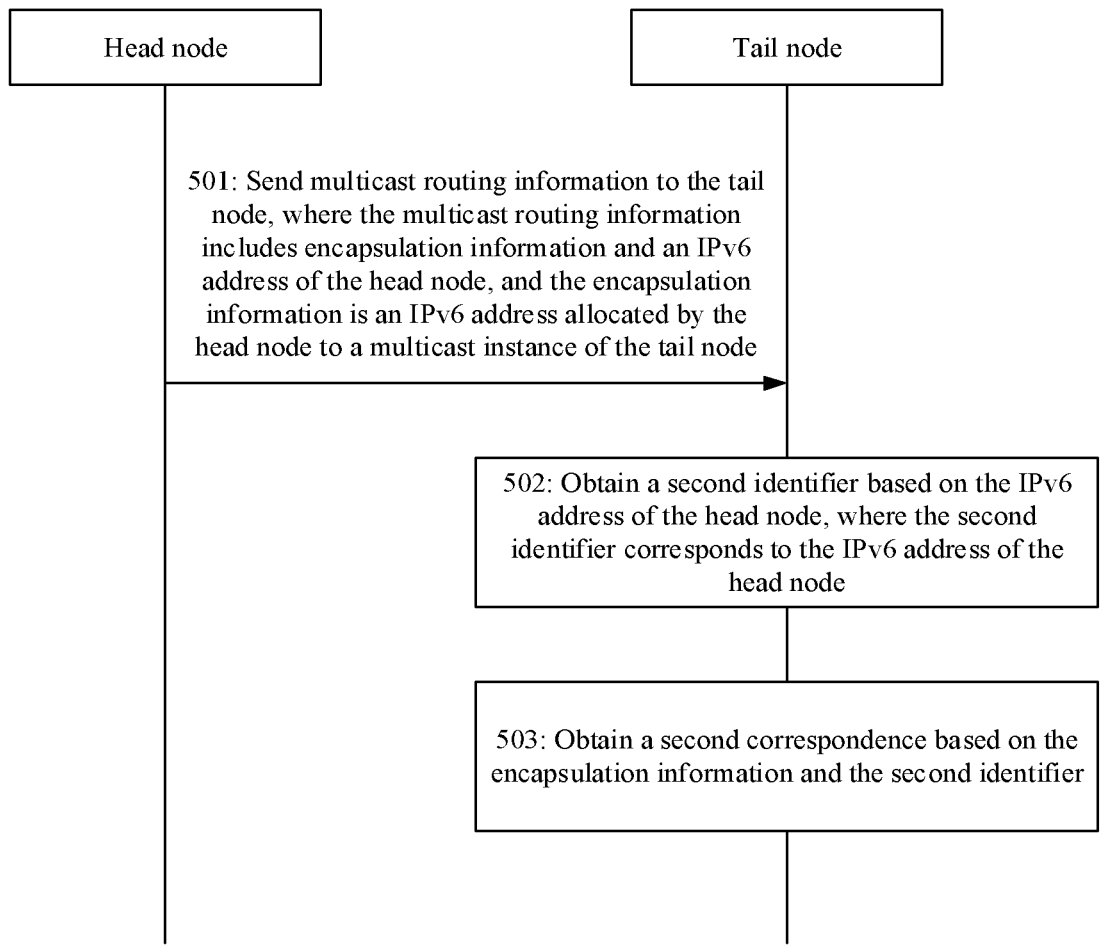
FIG. 6 is a signaling interaction diagram of another method for generating a second correspondence according to an embodiment of this application.

FIG. 6 is a signaling interaction diagram of another method for generating a second correspondence according to an embodiment of this application.

The method shown in FIG. 6 is a signaling interaction diagram in which a tail node generates the second correspondence when a tunnel that carries a multicast service is a BIERv6 tunnel. The method shown in FIG. 6 may be implemented, for example, by using the following steps 501 to 503.

Step 501: A head node sends multicast routing information to the tail node, where the multicast routing information includes encapsulation information and an IPv6 address of the head node, and the encapsulation information is an IPv6 address allocated by the head node to a multicast instance of the tail node.

In this embodiment of this application, when the tunnel that carries the multicast service is a BIERv6 tunnel, before transmitting a multicast data packet through a multicast network, the head node may send the multicast routing information to the tail node. The multicast routing information carries the IPv6 address of the head node and encapsulation information used by the head node. The encapsulation information is an IPv6 address allocated by the head node to the multicast instance of the tail node. Therefore, after receiving the multicast routing information, the tail node may parse the multicast routing information, to obtain the encapsulation information.

It can be understood that, for an MVPN, the multicast routing information is MVPN routing information, for example, BGP MVPN address family routing information. For an EVPN, the multicast routing information is EVPN routing information, for example, BGP EVPN address family routing information.

Step 502: The tail node obtains a second identifier based on the IPv6 address of the head node, where the second identifier corresponds to the IPv6 address of the head node.

Step 503: The tail node obtains the second correspondence based on the encapsulation information and the second identifier.

Steps 502 and 503 are similar to an implementation of steps 303 and 304. For a specific description, refer to a description part of steps 303 and 304. Details are not described herein again.

The foregoing describes second correspondence establishment manners respectively corresponding to the three types of tunnels that carry a multicast service. The following separately describes, with reference to a specific scenario for the three types of tunnels that carry a multicast service, specific implementations of establishing the second correspondence.

First, a specific implementation of establishing a second correspondence when a tunnel that carries a multicast service is an MPLS P2MP tunnel is described.

When the tunnel that carries a multicast service is an MPLS P2MP tunnel, encapsulation information is a label stack that includes MPLS P2MP Label. The second correspondence is an MPLS_P2MP entry, and the entry may be represented as: (MPLS P2MP Label, second identifier obtained from RootIPv6). MPLS P2MP Label indicates an MPLS P2MP tunnel label, and RootIPv6 indicates an IPv6 address of a head node. A process of establishing this entry is as follows.

A head node applies for an mLDP P2MP tunnel identifier FEC, and the FEC includes an IPv6 address 1 of the head node and a tunnel ID. Different tunnel IDs are used for different mLDP P2MP tunnels of a same node. The head node publishes an inclusive (IPMSI) route to a tail node. The route carries a PMSI tunnel attribute (PTA), and the PTA carries the applied FEC. The head node publishes the IPMSI route that carries the PTA, which is usually triggered by a configuration. For example, sender-enable is configured for the head node, to indicate that this node is a head node. The head node is configured with an IPMSI tunnel, and a specific type of the IPMSI tunnel is an mLDP, or the like.

After receiving an IPMSI routing message, the tail node establishes an mLDP P2MP tunnel based on FEC information. Further, the tail node allocates a label, namely, MPLS P2MP Label to the FEC, and establishes a correspondence between MPLS P2MP Label and a second identifier of the IPv6 address 1 of the head node, namely, the MPLS_P2MP entry. In addition, the tail node searches for a next hop of a route of this address based on address information of the head node in the FEC, and sends a mapping message to a next-hop router. The mapping message carries the FEC and MPLS P2MP Label allocated by the tail node. The next-hop router continues to send the mapping message to a next hop in a direction of the head node identified by the FEC, until an entire path is established.

The following describes a specific implementation of establishing a second correspondence when a tunnel that carries a multicast service is a BIER-MPLS tunnel.

In this embodiment of this application, when the tunnel that carries a multicast service is a BIER-MPLS tunnel, encapsulation information includes a BIER forwarding router head node identifier and a BIER MPLS label. The BIER forwarding router head node identifier may include sub-domain information and a BFIR-id field that are included in a BIFT-id field of a BIER-MPLS header. Correspondingly, the second correspondence is an MVPN_ILMBIER entry. The MVPN_ILMBIER entry may be represented as: (Sub-domain, BFIR-id, second identifier obtained from RootIPv6). The entry may have another field. For example, the MVPN_ILMBIER entry may be represented as: (Sub-domain, BFIR-id, VPN label, second identifier obtained from RootIPv6, VRF). This is not limited in this embodiment of this application. A process of establishing this entry is as follows.

A head node sends an IPMSI route or a selective provider multicast service interface (SPMSI) route and a PTA to a tail node. IPMSI or SPMSI routing information includes an IPv6 address 1 of the head node, and the PTA carries a sub-domain, BFR-id information, and an IPv6 bit forwarding router prefix (BFR-prefix) address 2. In addition, the IPMSI route further carries a route target (RT) extended community attribute. After receiving the IPMSI route or the SPMSI route and the PTA, the tail node learns of corresponding VRF of the tail node based on the RT extended community attribute, and establishes the MVPN_ILMBIER entry. The MVPN_ILMBIER entry is represented as (Sub-domain, BFIR-id, VPN Label, RootIP <second identifier>, VRF). BFIR-id is a BFR-id of the PTA in the routing message from the head node. Sub-domain, BFIR-id, and VPN Label are information that may be obtained from an outer encapsulation of a packet. For example, Sub-domain may be obtained from a BIFT-id field that is the first 20 bits of the BIER header of the packet, BFIR-id is obtained from the BFIR-id field in the BIER header, and VPN Label is obtained from a label after the BIER header of the packet. The second identifier obtained from RootIPv6 is the second identifier obtained from the IPv6 address 1 in the routing information in the IPMSI route of the head node, and is not a BFR-prefix address. The RootIPv6 address is also an address of a head node that may be selected during UMH route selection.

Finally, a specific implementation of establishing a second correspondence when a tunnel that carries a multicast service is a BIERv6 tunnel is described.

When the tunnel that carries a multicast service is a BIERv6 tunnel, encapsulation information is an outer IPv6 header and a BIER header located in an IPv6 extension header, and the second correspondence is an MVPN_ILMBIERv6 entry. The MVPN_ILMBIERv6 entry may be represented as: (IPv6 address that identifies an MVPN instance, second identifier obtained from RootIPv6). The entry may have another field, and is represented as: (IPv6 address that identifies an MVPN instance, second identifier obtained from RootIPv6, VRF). This is not limited in this embodiment of this application. A process of establishing this entry is as follows.

A head node sends, to a tail node, an IPMSI or SPMSI route, a PTA attribute, and an IPv6 address (in a Prefix-SID attribute) used to identify the MVPN instance. IPMSI or SPMSI routing information includes an IPv6 address 1 of the head node, a PTA carries a sub-domain, BFR-id information, and an IPv6 BFR-prefix address 2. In addition, the route further carries an RT extended community attribute and a Prefix-SID attribute. The Prefix-SID attribute includes an IPv6 address 3 that identifies a VPN instance. After receiving the IPMSI or SPMSI route, the PTA attribute, and the IPv6 address, the tail node learns of corresponding VRF of the tail node based on the RT extended community attribute, and establishes the MVPN_ILMBIER entry. The MVPN_ILMBIERv6 entry may be represented as: (IPv6 address that identifies a multicast instance, RootIP <second identifier>, VRF). The IPv6 address that identifies the MVPN is an IPv6 address 3 in the Prefix-SID attribute in the routing message from the head node and an address carried in a source address of a multicast data packet. The second identifier obtained from RootIPv6 is a second identifier corresponding to the IPv6 address 1 in the routing information of the IPMSI route of the head node, and represents the head node. For example, a same second identifier may be used for a plurality of MVPN instances. The second identifier is also a second identifier that may be used to identify the head node and that is selected during UMH route selection.

Figure 7:
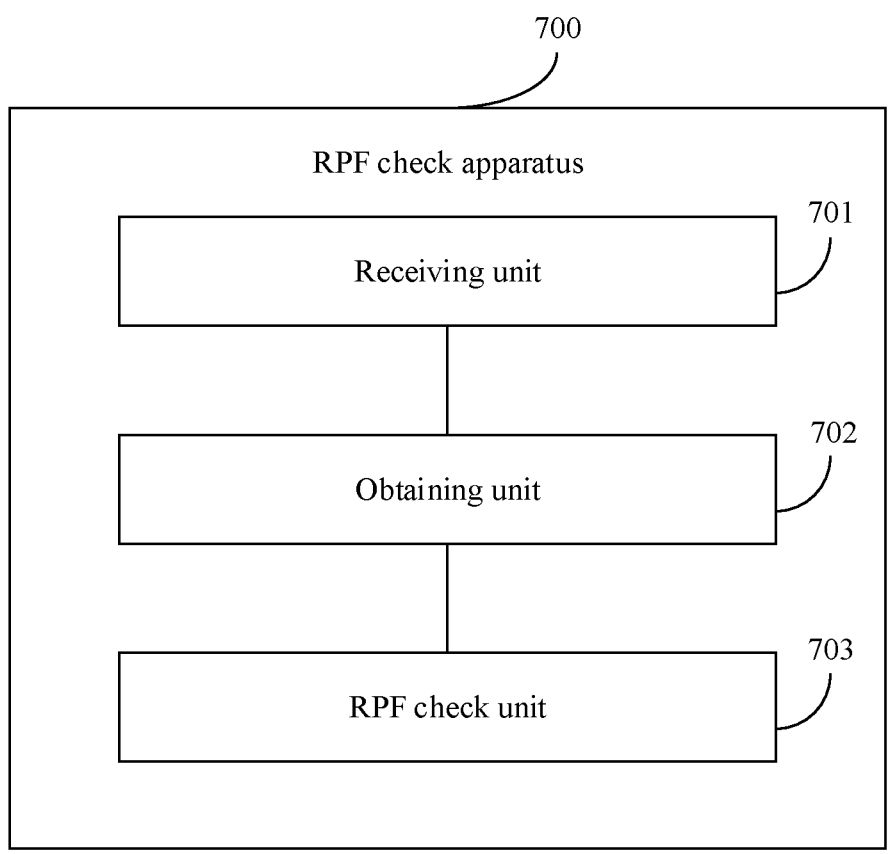
FIG. 7 is a schematic diagram of a structure of an RPF check apparatus according to an embodiment of this application.

Based on the RPF check method provided in the foregoing embodiments, an embodiment of this application further provides an RPF check apparatus, and the apparatus may be applied to a tail node. FIG. 7 is a schematic diagram of a structure of an RPF check apparatus according to an embodiment of this application.

An RPF check apparatus 700 shown in FIG. 7 is configured to perform an RPF check method performed by the tail node in the foregoing embodiments, and the method may include steps performed by the tail node in FIG. 2 to FIG. 6. For example, the RPF check apparatus 700 may include a receiving unit 701, an obtaining unit 702, and an RPF check unit 703.

The receiving unit 701 is configured to receive a multicast data packet from a head node. The multicast data packet includes a multicast source address, a multicast group address, and encapsulation information.

The obtaining unit 702 is configured to obtain a first identifier based on the multicast source address, the multicast group address, and a first correspondence. The first correspondence includes the multicast source address, the multicast group address, and the first identifier, and the first identifier is used to identify an UMH node corresponding to the multicast data packet.

The obtaining unit 702 is further configured to obtain a second identifier based on the encapsulation information and a second correspondence. The second correspondence includes the encapsulation information and the second identifier, the second identifier is used to identify the head node, and the first identifier and the second identifier each are less than 128 bits.

The RPF check unit 703 is configured to perform an RPF check based on the first identifier and the second identifier.

In an implementation, the receiving unit 701 is further configured to receive a multicast join message sent by a customer edge node. The multicast join message includes the multicast source address and the multicast group address.

The obtaining unit 702 is further configured to obtain an IPv6 address of the UMH node based on the multicast source address, obtain the first identifier based on the IPv6 address of the UMH node, where the first identifier corresponds to the IPv6 address of the UMH node, and obtain the first correspondence based on the multicast source address, the multicast group address, and the first identifier.

In an implementation, the first correspondence further includes an identifier of a multicast instance, and the obtaining unit 702 is further configured to determine an identifier of a multicast instance to which an interface that receives the multicast join message belongs, obtain the IPv6 address of the UMH node based on the multicast source address, a third correspondence, and the identifier of the multicast instance, where the third correspondence includes the multicast source address, the identifier of the multicast instance, and the IPv6 address of the UMH node, and obtain the first correspondence based on the multicast source address, the multicast group address, the identifier of the multicast instance, and the first identifier.

In an implementation, the identifier of the multicast instance includes an identifier of VRF or an identifier of an EVPN instance.

In an implementation, the receiving unit 701 is further configured to receive multicast routing information sent by the head node. The multicast routing information includes an IPv6 address of the head node and an identifier of a multiprotocol label switching MPLS P2MP tunnel between the head node and the tail node.

The obtaining unit 702 is further configured to obtain the encapsulation information based on the identifier of the MPLS P2MP tunnel and a fourth correspondence, where the fourth correspondence includes the identifier of the MPLS P2MP tunnel and the encapsulation information, and the encapsulation information includes a label allocated by the tail node to the MPLS P2MP tunnel, obtain the second identifier based on the IPv6 address of the head node, where the second identifier corresponds to the IPv6 address of the head node, and obtain the second correspondence based on the encapsulation information and the second identifier.

In an implementation, the receiving unit 701 is further configured to receive multicast routing information sent by the head node. The multicast routing information includes an IPv6 address of the head node and an identifier of a BIER tunnel between the head node and the tail node, and the identifier of the BIER tunnel includes a BIER sub-domain identifier sub-domain ID.

The obtaining unit 702 is further configured to obtain the encapsulation information based on the identifier of the BIER tunnel and a fifth correspondence, where the fifth correspondence includes the identifier of the BIER tunnel and the encapsulation information, and the encapsulation information includes a BIFT-ID corresponding to the tail node, obtain the second identifier based on the IPv6 address of the head node, where the second identifier corresponds to the IPv6 address of the head node, and obtain the second correspondence based on the encapsulation information and the second identifier.

In an implementation, the receiving unit 701 is further configured to receive multicast routing information sent by the head node. The multicast routing information includes the encapsulation information and an IPv6 address of the head node, and the encapsulation information is an IPv6 address allocated by the head node to a multicast instance of the tail node.

The obtaining unit 702 is further configured to obtain the second identifier based on the IPv6 address of the head node, where the second identifier corresponds to the IPv6 address of the head node, and obtain the second correspondence based on the encapsulation information and the second identifier.

In an implementation, the multicast routing information includes MVPN routing information or EVPN routing information.

In an implementation, the first identifier and the second identifier each are a value less than or equal to 32 bits.

In an implementation, the first identifier and the second identifier fall within one of the following address ranges: 0x7F000000-0x7FFFFFFF or 0xE0000000-0xEFFFFFFF.

Because the apparatus 700 is an apparatus corresponding to the RPF check method provided in the foregoing method embodiments, a specific implementation of each unit of the apparatus 700 has a same concept as that of the foregoing method embodiments. Therefore, for the specific implementation of each unit of the apparatus 700, refer to a description part of the foregoing method embodiments. Details are not described herein again.

An embodiment of this application further provides an RPF check device. The device includes a processor and a memory.

The memory is configured to store instructions.

The processor is configured to execute the instructions in the memory, and perform an RPF check method performed by a tail node in the foregoing method embodiments.

Figure 8:
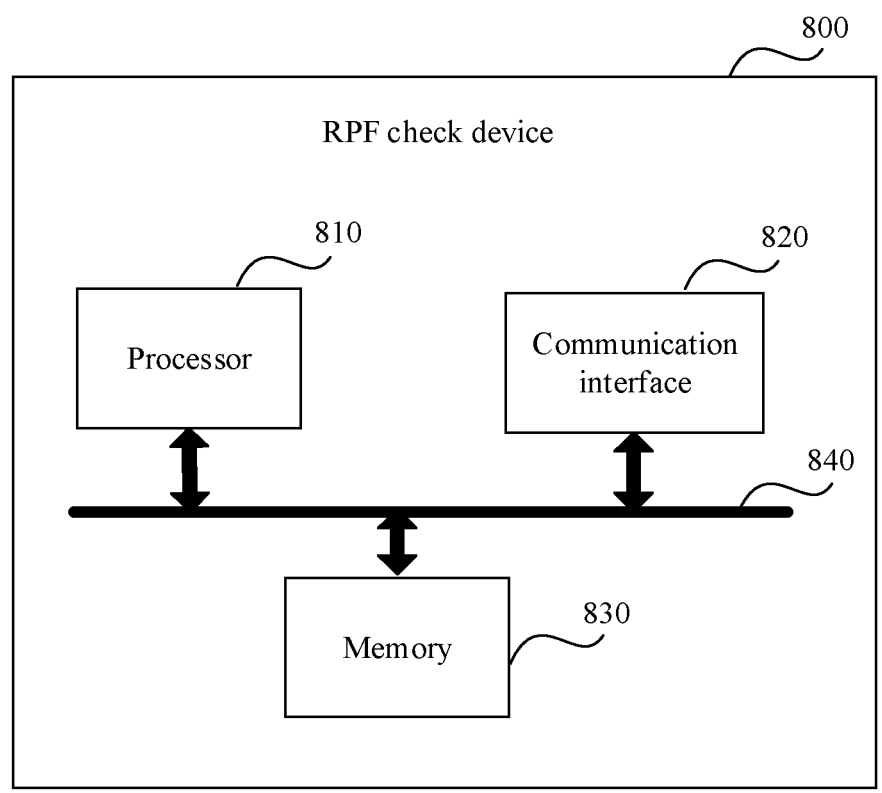
FIG. 8 is a schematic diagram of a structure of an RPF check device according to an embodiment of this application.

It should be noted that a hardware structure of the RPF check device provided in this embodiment of this application may be a structure shown in FIG. 8. FIG. 8 is a schematic diagram of a structure of an RPF check device 800 according to an embodiment of this application.

Refer to FIG. 8. The RPF check device 800 includes a processor 810, a communication interface 820, and a memory 830. There may be one or more processors 810 in the device 800. One processor is used as an example in FIG. 8. In this embodiment of this application, the processor 810, the communication interface 820, and the memory 830 may be connected through a bus system or in another manner. In FIG. 8, an example in which the processor 810, the communication interface 820, and the memory 830 are connected through a bus system 840 is used.

The processor 810 may be a central processing unit (CPU), a network processor (NP), or a combination of a CPU and an NP. The processor 810 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 830 may include a volatile memory, for example, a random-access memory (RAM). The memory 830 may alternatively include a non-volatile memory, for example, a flash memory, a hard disk drive (HDD), or a solid-state drive (SSD). The memory 830 may further include a combination of the foregoing types of memories.

The memory 830 may store the first correspondence, the second correspondence, the third correspondence, the fourth correspondence, and the fifth correspondence in the foregoing embodiments.

Optionally, the memory 830 stores an operating system and a program, an executable module or a data structure, or a subset thereof, or an extended set thereof. The program may include various operation instructions, used to implement various operations. The operating system may include various system programs, used to implement various basic services and process hardware-based tasks. The processor 810 may read a program in the memory 830, to implement the RPF check method provided in the embodiments of this application.

The bus system 840 may be a Peripheral Component Interconnect (PCI) bus, an Extended Industry Standard Architecture (EISA) bus, or the like. The bus system 840 may be classified into an address bus, a data bus, a control bus, and the like. For ease of representation, only one thick line is used to represent the bus system in FIG. 8, but this does not mean that there is only one bus or only one type of bus.

An embodiment of this application further provides a computer-readable storage medium, including instructions. When the instructions run on a computer, the computer is enabled to perform an RPF check method that is performed by a tail node and that is provided in the method embodiments.

An embodiment of this application further provides a computer program product including instructions. When the computer program product runs on a computer, the computer is enabled to perform an RPF check method that is performed by a tail node and that is provided in the method embodiments.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, the terms "include", "contain", and any other variants mean to cover non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions in the embodiments.

In addition, module units in the embodiments of this application may be integrated into one processing unit, or each of the units may exist alone physically, or two or more units are integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a RAM, a magnetic disk, or an optical disc.

Persons skilled in the art should be aware that in the foregoing one or more examples, functions described in the present disclosure may be implemented by hardware, software, firmware, or any combination thereof. When the software is used to implement the functions, the functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

In the foregoing specific implementations, the objectives, technical solutions, and beneficial effects of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
receiving a multicast data packet comprising a multicast source address, a multicast group address, and encapsulation information;
obtaining, based on the multicast source address, the multicast group address, and a first correspondence, a first identifier identifying an upstream multicast hop (UMH) node corresponding to the multicast data packet, wherein the first correspondence comprises the multicast source address, the multicast group address, and the first identifier;
obtaining, based on the encapsulation information and a second correspondence, a second identifier identifying a head node, wherein the second correspondence comprises the encapsulation information and the second identifier, and wherein each of the first identifier and the second identifier is less than or equal to 32 bits; and
performing, based on the first identifier and the second identifier, a reverse path forwarding (RPF) check.

2. The method of claim 1, further comprising:
receiving a multicast join message comprising the multicast source address and the multicast group address;
obtaining, based on the multicast source address, a first address of the UMH node;
further obtaining, based on the first address, the first identifier corresponding to the first address; and
obtaining, based on the multicast source address, the multicast group address, and the first identifier, the first correspondence.

3. The method of claim 2, wherein the first correspondence further comprises a third identifier of a first multicast instance, and wherein the method further comprises:
obtaining determining a fourth identifier of a second multicast instance to which an interface that receives the multicast join message belongs;
further obtaining, based on the multicast source address, a third correspondence, and the fourth identifier, the first address, wherein the third correspondence comprises the multicast source address, the fourth identifier, and the first address; and
further obtaining, based on the multicast source address, the multicast group address, the fourth identifier, and the first identifier, the first correspondence.

4. The method of claim 3, wherein the fourth identifier comprises a fifth identifier of virtual routing and forwarding (VRF) or a sixth identifier of an Ethernet virtual private network (EVPN) instance.

5. The method of claim 1, further comprising:
receiving multicast routing information comprising a second address of the head node and a seventh identifier of a Multiprotocol Label Switching (MPLS) point-to-multipoint (P2MP) tunnel between the head node and a tail node;
obtaining, based on the seventh identifier and a fourth correspondence, the encapsulation information, wherein the fourth correspondence comprises the seventh identifier and the encapsulation information, and wherein the encapsulation information comprises a label allocated by the tail node to the MPLS P2MP tunnel;
further obtaining, based on the second address, the second identifier corresponding to the second address; and
obtaining, based on the encapsulation information and the second identifier, the second correspondence.

6. The method of claim 5, wherein the multicast routing information comprises multicast virtual private network (MVPN) routing information or Ethernet virtual private network (EVPN) routing information.

7. The method of claim 1, further comprising:
receiving multicast routing information comprising a second address of the head node and an eighth identifier of a Bit Index Explicit Replication (BIER) tunnel between the head node and a tail node, wherein the eighth identifier comprises a BIER sub-domain identifier (ID);
obtaining, based on the eighth identifier and a fifth correspondence, the encapsulation information, wherein the fifth correspondence comprises the eighth identifier and the encapsulation information, and wherein the encapsulation information comprises a bit index forwarding table identifier (BIFT-id) corresponding to the tail node;
further obtaining, based on the second address, the second identifier corresponding to the second address; and
obtaining, based on the encapsulation information and the second identifier, the second correspondence.

8. The method of claim 1, further comprising:
receiving multicast routing information comprising the encapsulation information and a second address of the head node, wherein the encapsulation information is a third address allocated by the head node to a multicast instance of a tail node;
further obtaining, based on the second address, the second identifier corresponding to the second address; and
obtaining, based on the encapsulation information and the second identifier, the second correspondence.

9. The RPF check method of claim 1, wherein the first identifier and the second identifier fall within one of the following address ranges:
0x7F000000-0x7FFFFFFF; or
0xE0000000-0xEFFFFFFF.

10. An apparatus, comprising:
a memory configured to store instructions; and
one or more processors coupled to the memory, wherein the instructions cause the one or more processors to be configured to:
receive, from a head node, a multicast data packet comprising a multicast source address, a multicast group address, and encapsulation information;
obtain, based on the multicast source address, the multicast group address, and a first correspondence, a first identifier identifying an upstream multicast hop (UMH) node corresponding to the multicast data packet, wherein the first correspondence comprises the multicast source address, the multicast group address, and the first identifier;

obtain, based on the encapsulation information and a second correspondence, a second identifier identifying the head node, wherein the second correspondence comprises the encapsulation information and the second identifier, and wherein each of the first identifier and the second identifier is less than or equal to 32 bits; and perform, based on the first identifier and the second identifier, a reverse path forwarding (RPF) check.

11. The apparatus of claim 10, wherein the instructions further cause the one or more processors to be configured to:

receive, from a customer edge node, a multicast join message comprising the multicast source address and the multicast group address;

obtain, based on the multicast source address, a first address of the UMH node;

further obtain, based on the first address, the first identifier corresponding to the first address; and obtain, based on the multicast source address, the multicast group address, and the first identifier, the first correspondence.

12. The apparatus of claim 11, wherein the first correspondence further comprises a third identifier of a first multicast instance, and wherein the instructions further cause the one or more processors to be configured to:

obtain a fourth identifier of a second multicast instance to which an interface that receives the multicast join message belongs;

further obtain, based on the multicast source address, a third correspondence, and the fourth identifier, the first address, wherein the third correspondence comprises the multicast source address, the fourth identifier, and the first address; and further obtain, based on the multicast source address, the multicast group address, the fourth identifier, and the first identifier, the first correspondence.

13. The apparatus of claim 12, wherein the fourth identifier comprises a fifth identifier of virtual routing and forwarding (VRF) or a sixth identifier of an Ethernet virtual private network (EVPN) instance.

14. The apparatus of claim 10, wherein the instructions further cause the one or more processors to be configured to:

receive, from the head node, multicast routing information comprising a second address of the head node and a seventh identifier of a Multiprotocol Label Switching (MPLS) point-to-multipoint (P2MP) tunnel between the head node and the apparatus;

obtain, based on the seventh identifier and a fourth correspondence, the encapsulation information, wherein the fourth correspondence comprises the seventh identifier and the encapsulation information, and wherein the encapsulation information comprises a label allocated by the apparatus to the MPLS P2MP tunnel;

further obtain, based on the second address, the second identifier corresponding to the second address; and obtain, based on the encapsulation information and the second identifier, the second correspondence.

15. The apparatus of claim 14, wherein the multicast routing information comprises multicast virtual private network (MVPN) routing information or Ethernet virtual private network (EVPN) routing information.

16. The apparatus of claim 10, wherein the instructions further cause the one or more processors to be configured to:

receive multicast routing information comprising a second address of the head node and an eighth identifier of a Bit Index Explicit Replication (BIER) tunnel between the head node and the apparatus, wherein the eighth identifier comprises a BIER sub-domain identifier (ID);

obtain, based on the eighth identifier and a fifth correspondence, the encapsulation information, wherein the fifth correspondence comprises the eighth identifier and the encapsulation information, and wherein the encapsulation information comprises a bit index forwarding table identifier (BIFT-id) corresponding to the apparatus;

further obtain, based on the second address, the second identifier corresponding to the second address; and obtain, based on the encapsulation information and the second identifier, the second correspondence.

17. The apparatus of claim 10, wherein the instructions further cause the one or more processors to be configured to:

receive multicast routing information comprising the encapsulation information and a second address of the head node, wherein the encapsulation information is a third address allocated by the head node to a multicast instance of the RPF check apparatus;

further obtain, based on the second address, the second identifier corresponding to the second address; and obtain, based on the encapsulation information and the second identifier, the second correspondence.

18. The apparatus of claim 10, wherein each of the first identifier and the second identifier fall within one of the following address ranges:

0x7F000000-0x7FFFFFFF; or

0xE0000000-0xEFFFFFFF.

19. A computer program product comprising computer-executable instructions that are stored on a non-transitory computer-readable medium and that, when executed by one or more processors, cause a tail node to:

receive, from a head node, a multicast data packet comprising a multicast source address, a multicast group address, and encapsulation information;

obtain, based on the multicast source address, the multicast group address, and a first correspondence, a first identifier identifying an upstream multicast hop (UMH) node corresponding to the multicast data packet, wherein the first correspondence comprises the multicast source address, the multicast group address, and the first identifier;

obtain, based on the encapsulation information and a second correspondence, a second identifier identifying the head node, wherein the second correspondence comprises the encapsulation information and the second identifier, and wherein each of the first identifier and the second identifier is less than or equal to 32 bits; and perform, based on the first identifier and the second identifier, a reverse path forwarding (RPF) check.

20. The computer program product of claim 19, wherein the first identifier and the second identifier fall within one of the following address ranges:

0x7F000000-0x7FFFFFFF; or

0xE0000000-0xEFFFFFFF.

* * * * *

UNITED STATES PATENT AND TRADEMARK OFFICE
CERTIFICATE OF CORRECTION

PATENT NO. : 11,997,004 B2  
APPLICATION NO. : 17/701180  
DATED : May 28, 2024  
INVENTOR(S) : Jingrong Xie et al.

Page 1 of 1

It is certified that error appears in the above-identified patent and that said Letters Patent is hereby corrected as shown below:

On the Title Page

Page 2, item (56): "IN 102891758 A 1/2013" should read "CN 102891758 A 1/2013"

In the Claims

Claim 3, Column 23, Line 53: "obtaining determining a fourth" should read "obtaining a fourth"

Claim 9, Column 24, Line 50: "The RPF check method" should read "The method"

Claim 17, Column 26, Line 25: "the RPF check apparatus" should read "the apparatus"

Signed and Sealed this  
Ninth Day of July, 2024

Katherine Kelly Vidal  
*Director of the United States Patent and Trademark Office*